United States Patent [19]

Moertel

[11] 4,090,832
[45] May 23, 1978

[54] APPARATUS FOR MAKING SLIDE FASTENER

[75] Inventor: George B. Moertel, Conneautville, Pa.

[73] Assignee: Textron Inc., Providence, R.I.

[21] Appl. No.: 762,596

[22] Filed: Jan. 26, 1977

Related U.S. Application Data

[62] Division of Ser. No. 596,109, Jul. 16, 1975, Pat. No. 4,034,056, which is a division of Ser. No. 380,323, Jul. 18, 1973, Pat. No. 3,906,595.

[51] Int. Cl.² .............................................. B29C 17/02
[52] U.S. Cl. .................................... 425/391; 425/814; 28/247; 57/6; 57/9
[58] Field of Search ................... 156/431; 57/3, 9, 10, 57/13, 34 HS, 138, 160; 28/1.2; 425/391, 814

[56] References Cited

U.S. PATENT DOCUMENTS

| | | | |
|---|---|---|---|
| 3,053,288 | 9/1962 | Burbank | 57/13 X |
| 3,147,578 | 9/1964 | Calizzano | 28/1.2 X |
| 3,196,489 | 7/1965 | Chery | 425/814 X |
| 3,431,337 | 3/1969 | Heimberger | 425/391 X |

Primary Examiner—Robert L. Spicer, Jr.

[57] ABSTRACT

A slide fastener and method and apparatus for making the same are disclosed wherein coils of filamentary material are secured to adjacent edges of a pair of carrier tapes. Each coil of filamentary material is formed from a filament having a specially shaped cross section which is arranged in a mirror image relationship with respect to its adjacent filamentary coil. During formation of the filamentary coils, they are simultaneously wound on a mandrel having differently shaped surfaces which aid in the final shaping of each coil.

8 Claims, 28 Drawing Figures

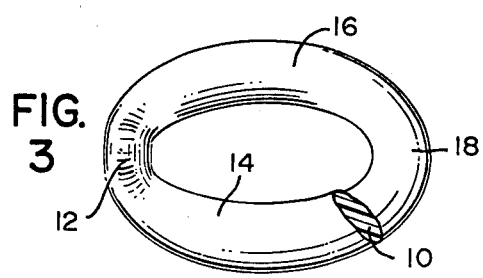
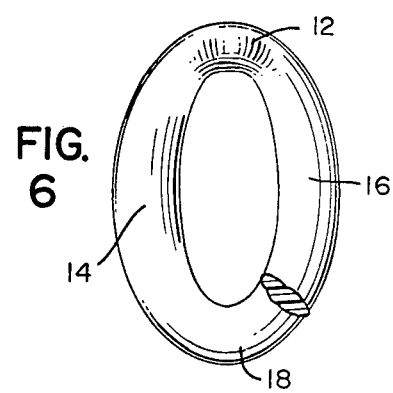
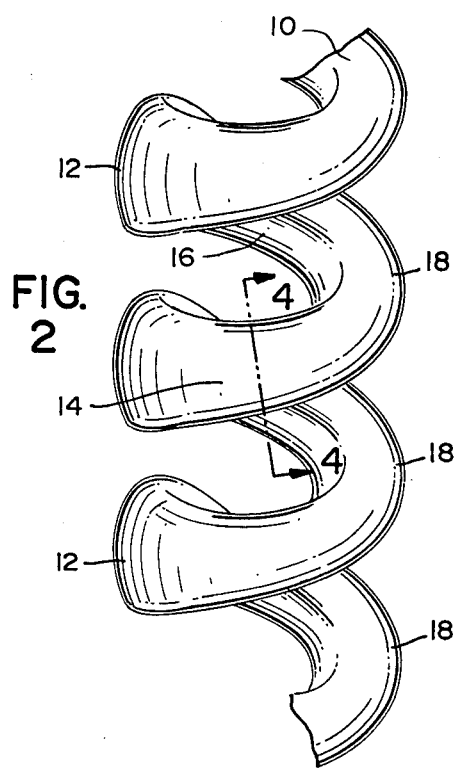
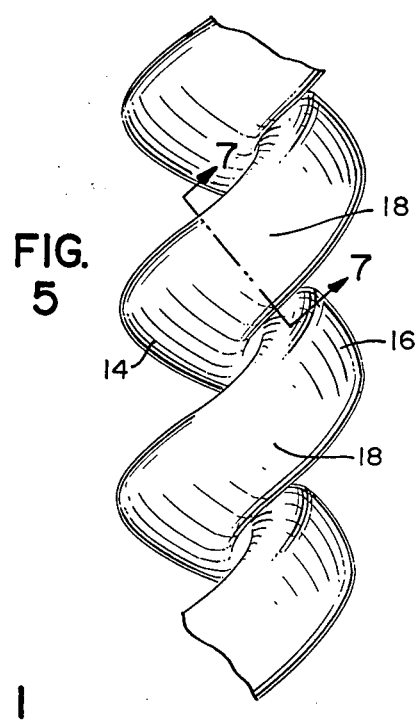
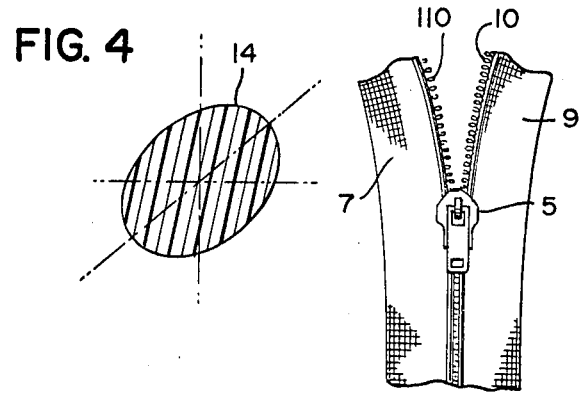
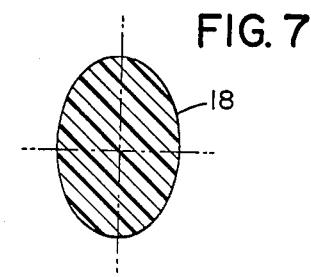

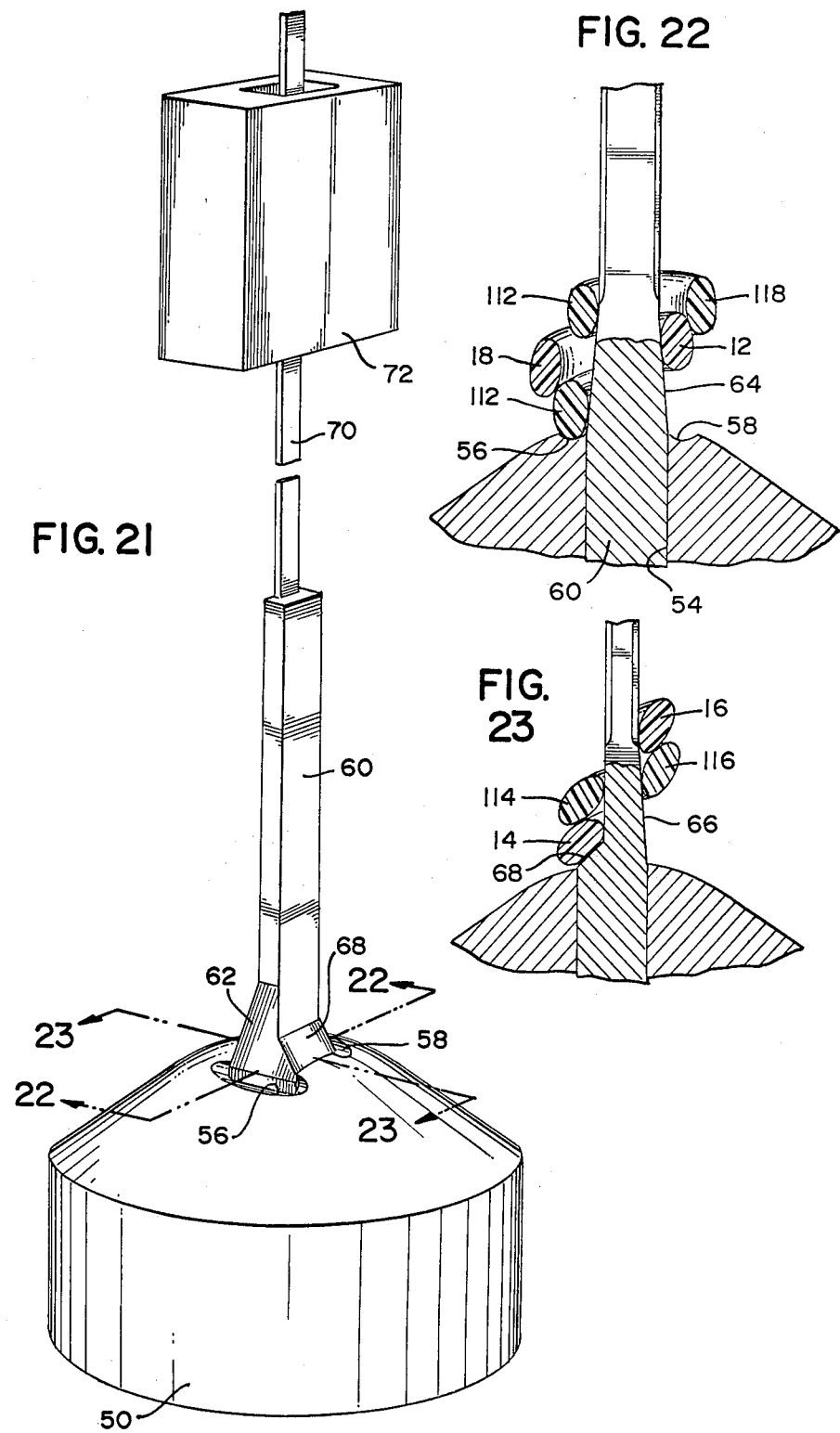

APPARATUS FOR MAKING SLIDE FASTENER

CROSS REFERENCE TO RELATED APPLICATIONS

This is a divisional Application of pending Application Ser. No. 596,109 filed July 16, 1975, now U.S. Pat No. 4,034,056, as a divisional Application of parent application Ser. No. 380,323 filed July 18, 1973, now U.S. Pat. No. 3,906,595.

BACKGROUND OF THE INVENTION

1. Field of the Invention

This invention relates to slide fasteners and to a method and apparatus for making the same, and in particular to the structural formation of the filamentary coils for slide fasteners.

2. Description of the Prior Art

It has been conventional for the coil of slide fasteners to be formed from filamentary material with each convolution of the coil having head and heel elements interconnected by leg elements; simultaneous formation of a pair of coils has been accomplished on coiling machines which shape the convolutions of the filamentary coils on suitable mandrels and intermesh such coils after their formation.

U.S. Pat. Nos. 1,937,297, 2,296,880, 2,300,442, 2,300,443, 2,541,728, 2,643,432, 2,907,066, 2,973,554, 3,053,288, 3,145,523, 3,152,433, 3,196,489, 3,553,782 and 3,609,827 are representative of the prior art in illustrating a variety of cross sections for the interlocking elements of slide fasteners as well as a variety of methods and apparatuses for forming the same.

One of the problems associated with the prior art devices is that the manufacture of slide fastener coils having non-circular cross sections has resulted in slide fasteners that have a low index of flexibility and a high index of rigidity. While the prior art devices may have been satisfactory for the particular purpose for which they were designed, they have not been satisfactory in maintaining the proper flexibility for the different types and sizes of slide fasteners utilizing filamentary coil of the plastic type. The many methods and apparatus in the prior art have served their particular purposes with respect to the types of slide fastener coils for which they were designed. However, such prior art arrangements have always utilized a symmetrical association of coiling steps and mandrel configuration.

SUMMARY OF THE INVENTION

The present invention is summarized in a slide fastener device and a method and apparatus for making the same wherein the slide fastener device includes a pair of carrier tapes having edges disposed adjacent each other, a pair of interengaging filamentary coils respectively attached to the edges of the carrier tapes with each coil having a plurality of convolutions disposed along a longitudinal axis parallel to a longitudinal axis defined by its carrier tape edge, each convolution of each coil including a bight element with first and second links extending therefrom and a connector member interconnecting a link of one convolution with a second link of an adjacent convolution, the bight elements of one coil being generally adjacent the connector members of the other coil, the first links of one coil engaging the first links of the other coil in a first pattern, and the second links of one coil engaging the second links of the other coil in a second pattern different from the first pattern whereby the filamentary coils are easily flexed with their respective carrier tapes.

An object of the present invention is to increase the flexibility of a slide fastener without decreasing the strength of the slide fastener.

Another object of the present invention is to increase the strength of a slide fastener while reducing the size thereof.

This invention has another object in that the coils of a slide fastener device are meshed together in a nesting arrangement.

Another object of this invention is to eliminate sharp edged interlocking elements on the filamentary coils of slide fasteners.

Still another object of this invention is to construct the coils of a slide fastener by a reorientation of the geometry of the filamentary coils.

The present invention has another object in that the coils of a slide fastener are made by wrapping a generally elliptical filament around a mandrel having asymmetrical surfaces.

It is a further object of the present invention to construct a coil forming mandrel with differently shaped sloping surfaces about which a pair of filamentary coils are wound into predetermined shapes.

Other objects and advantages of the present invention will become apparent from the following description taken in conjunction with the accompanying drawings.

BRIEF DESCRIPTION OF THE DRAWINGS

FIG. 1 is a partial front elevation view of a slide fastener embodying the present invention;

FIG. 2 is a partial front elevation view of the right hand coil of FIG. 1 on an enlarged scale;

FIG. 3 is a top plan view of FIG. 2;

FIG. 4 is a cross sectional view taken along line 4—4 of FIG. 2;

FIG. 5 is a side elevation as viewed from the right of FIG. 2;

FIG. 6 is a top plan view of FIG. 5;

FIG. 7 is a cross sectional view taken along line 7—7 of FIG. 5;

FIG. 21 is a perspective view of the mandrel of FIG. 18 on an enlarged scale;

FIG. 22 is a partial cross sectional view taken along line 22—22 of FIG. 21 with parts added;

FIG. 23 is a partial cross sectional view taken along line 23—23 of FIG. 21 with parts added;

DESCRIPTION OF THE PREFERRED EMBODIMENTS

Figure 9:
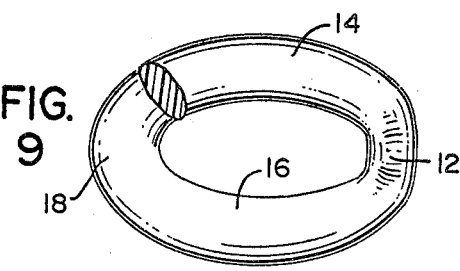
FIG. 9 is a top plan view of FIG. 8.

The present invention is embodied in a slide fastener illustrated in FIG. 1 as including a slider and pull assembly 5 which is moved longitudinally along a pair of stringers for opening and closing the opening in a garment or the like as is well known in the art. The stringers include a pair of carrier tapes 7 and 9, the adjacent edges of which are provided with interlocking elements made of a suitable plastic filamentary material, such as a nylon, a polyester, or the like. As viewed in FIG. 1 the interlocking elements are designated as the right-hand filamentary coil 10 which is suitably secured to the edge of the carrier tape 9; the left-hand filamentary coil 110 is similarly secured to an adjacent edge of the left-hand carrier tape 7. The terms left, right, front, rear, etc. are being used herein to order to facilitate the description of the structural components.

As is illustrated in FIGS. 2 and 3, the filamentary coil 10 is defined by a series of convolutions each of which includes a bight element 12 with its opposite ends having links 14 and 16 and with a connector member 18 interconnecting the front link 14 of one convolution with the rear link 16 of an adjacent convolution. The filament of the coil 10 may have any suitable cross-sectional configuration that approaches an elliptical shape; i.e., the exact parameters of the major and minor axes, may vary widely but they may not be equal as in the case of a circular cross-sectional configuration. In accordance with the present invention the elliptical cross section of the filament of the coil is substantially the same throughout its length and the appearance that certain components of each convolution may be of different sizes than other components is not primarily accomplished by a deformation of the particular component but rather is accomplished by a reorientation of the major and minor axes of each convolution's components with respect to each other. While it is not necessary for the purposes of the present invention, it will be noted that the bight element 12 is slightly enlarged along its major axis because of the apparatus utilized in coiling filamentary material; i.e., the bight element 12 is physically folded or wrapped around a surface small enough to cause a high unit pressure whereby the bight element 12 is slightly compressed against a surface perpendicular to its minor axis causing a slight reduction in its minor axis and a correspondingly slight enlargement of its major axis (see FIG. 13).

As viewed in FIG. 4, the major axis of the front link 14 is inclined approximately 60° from the vertical which defines the longitudinal plane in which the filamentary coil 10 is disposed. The connector member 18, which connects adjacent front and rear link 14 and 16 is shown in FIGS. 5 and 6 to be generally opposite the bight element 12; the major axis of the filament of the coil 10 at the connector member 18 is shown in FIG. 7 to be rotated approximately 60° counterclockwise from that of the front link 14 of FIG. 4, i.e., the major axis of the connector member 18 substantially coincides with the vertical defining such longitudinal plane.

Figure 8:
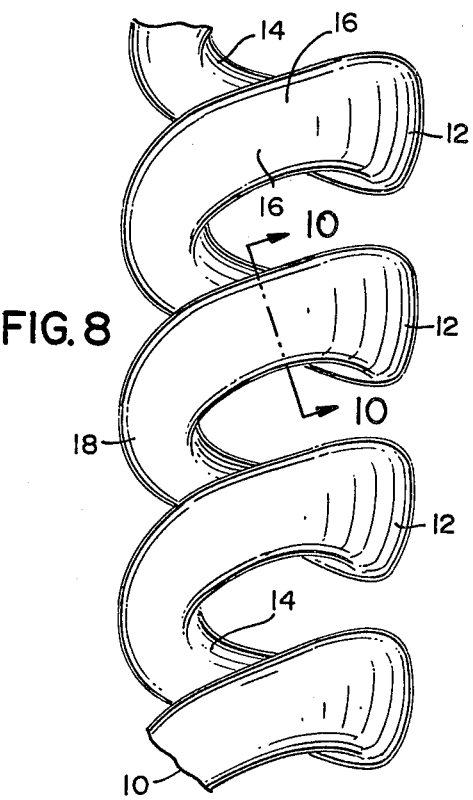
FIG. 8 is a view similar to FIG. 2 but showing a rear elevation view of the right hand coil of FIG. 1.
Figure 10:
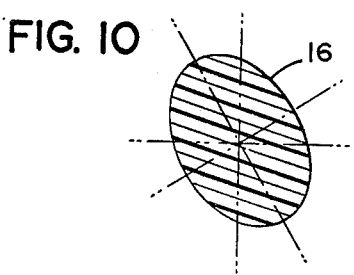
FIG. 10 is a cross sectional view taken along line 10—10 of FIG. 8.

The rear link 16 is more clearly illustrated in FIGS. 8–10 which respectively resemble FIGS. 2–4 but which differ therefrom in that the major axis of the rear link 16 is displaced 90° counterclockwise from that shown in FIG. 4 for the front link 14. Thus, the major axis of the ellipse forming the rear link 16 is inclined approximately 30° counterclockwise from the vertical which defines the above longitudinal plane (see FIG. 10).

Figure 12:
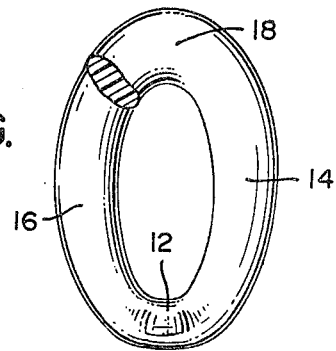
FIG. 12 is a top plan view of FIG. 11.
Figure 11:
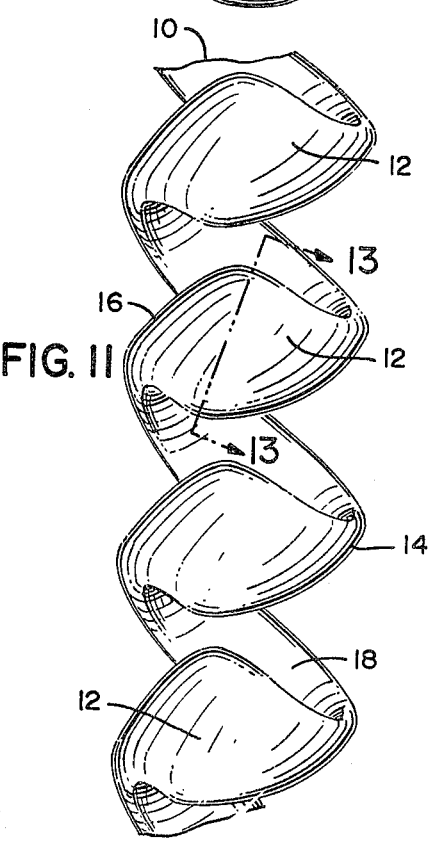
FIG. 11 is a side elevation as viewed from the right of FIG. 8.
Figure 13:
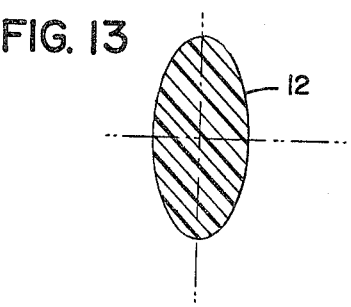
FIG. 13 is a cross sectional view taken along line 13—13 of FIG. 11.

The bight element 12 shown in FIGS. 11 and 12 is generally opposite to the connector member 18 and its cross section is substantially the same as that shown for connector member 18 in FIG. 7. However, inasmuch as the bight element 12 is slightly compressed along its minor axis as discussed above, the cross section of the bight element 12 of FIG. 13 is not identical to that of FIG. 7. The major axis of the bight element 12 is shown in FIG. 13 to be rotated approximately 30° clockwise from that of the rear link 16 of FIG. 10; i.e., the major axis of the bight element 12 substantially coincides with the vertical defining the above longitudinal plane.

The filamentary coils 10 and 110 have substantially the same components so that a detailed description of coil 110 is being omitted for the sake of brevity and the corresponding components merely being identified with the same reference numerals with 100 added. For example, each convolution of the left hand coil 110 includes a bight element 112, front and rear links 114 and 116, and a connector member 118; in addition, the coil 110 is disposed in mirror image relation to the coil 10 so that bight elements 12 and 112 face each other when the slide fastener of FIG. 1 is opened.

Figure 14:
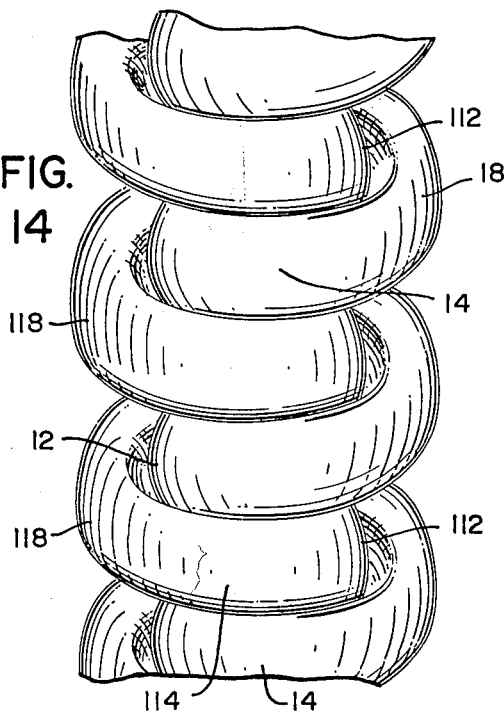
FIG. 14 is a partial front elevation view of the coils in FIG. 1 in mating positions.

A portion of the slide fastener coils 10 and 110 is illustrated in FIG. 14 in a closed position and the front links 14 and 114 are nested into contact with each other in a generally parallel arrangement. As is apparent from FIGS. 2 and 15, each front link 14 and 114 has a geometry that is continuously changing because each coil 10 and 110 is formed in the general construction of an open helix. The geometry of coil 10 changes from its front link 14 to its bight element 12 by reorientation of the cross-sectional major axis from its position shown in FIG. 4 to its position shown in FIG. 13, thence from bight element 12 to its rear link 16 by reorientation of the major axis from its position shown in FIG. 13 to its position shown in FIG. 10, and finally from its rear link 16 to its connector member 18 by reorientation of the major axis from its position shown in FIG. 10 to its position shown in FIG. 7.

Figure 15:
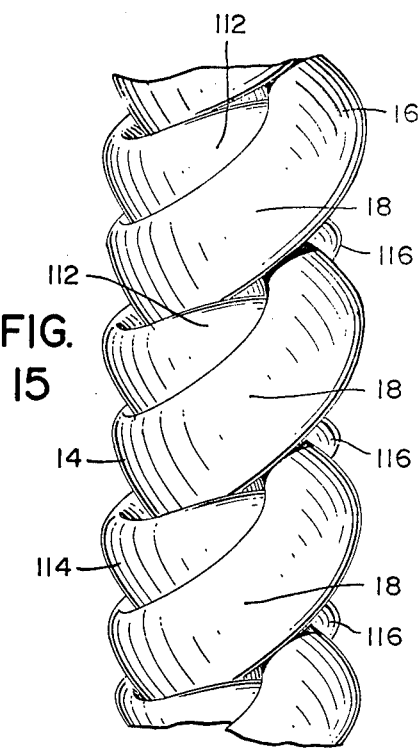
FIG. 15 is a side elevation view as viewed from the right of FIG. 14.
Figure 16:
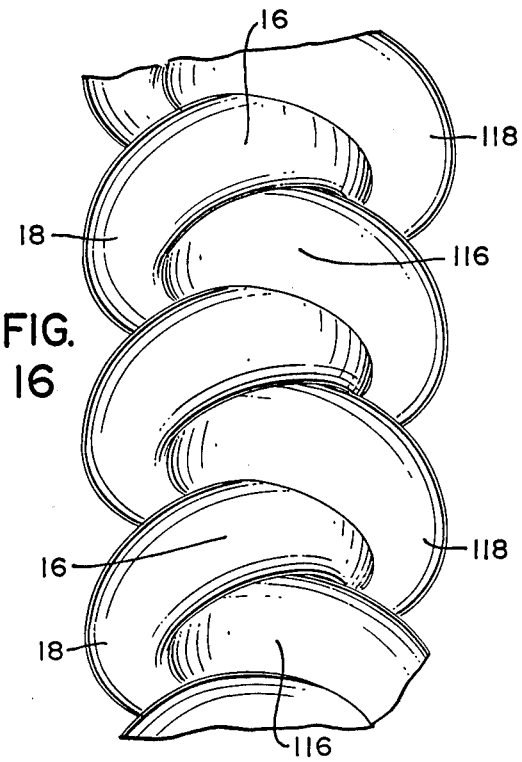
FIG. 16 is a partial rear elevation view of the detail shown in FIG. 14.
Figure 17:
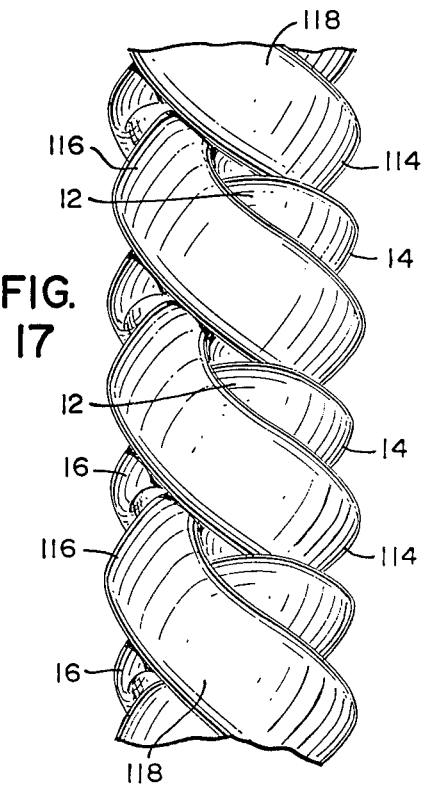
FIG. 17 is a side elevation view as viewed from the right of FIG. 16.

Each front link 14 (114) has an asymmetrical geometry with respect to its rear link 6 (116). As is shown in FIGS. 2, 14, and 15, the front link 14 (114) is generally perpendicular relative to the longitudinal axis defined by the plane of coil 10 (110); thus, the front links 14 of coil 10 are generally parallel to the front links 114 of the coil 110 as best seen in FIG. 14. As is shown in FIGS. 5, 16 and 17, the link 16 (116) is generally inclined relative to the longitudinal axis defined by the plane of the coil 10 (110); the links 16 and 116 are not parallel to each other but rather are inclined toward each other as best seen in FIG. 16. The parallel and inclined relationship applies generally to the respective central portions of the adjacent links 14 and 114 and the adjacent links 16 and 116 because the cross-sectional geometry of each coil 10 and 110 changes as the components of each convolution is shaped.

When the two coils 10 and 110 are intermeshed, as illustrated in the lower part of FIG. 1, the front side of FIG. 1 is shown in FIG. 14 as having a generally parallel arrangement while the rear side is shown in FIG. 16 as having a generally herringbone arrangement. In addition, the bight element 12 of coil 10 is nested between the links 114 and 116 and spaced slightly from the connector member 118 of coil 110 (see FIGS. 14 and 17), while the bight element 112 of coil 110 is nested between the links 14 and 16 and spaced slightly from the connector member 18 of coil 10 (see FIGS. 14 and 15).

With the above arrangement, a slide fastener constructed according to the present invention exhibits a high degree of flexibility together with a high degree of lateral strength. By rearranging the geometry of each coil 10 and 110 into an asymmetrical construction, the front and rear sides have different configurations which permits the convolutions of one coil to be closely interlocked with the adjacent convolutions of the other coil whereby the overall strength of the slide fastener chain is enhanced. Since the bight elements 12 and 112 have their major axes oriented to be parallel with and substantially coinciding with the longitudinal plane in which the coils 10 and 110 are disposed, improper lateral separation of the bight elements from their interlocked arrangement is virtually precluded. For example, the bight element 12 has its major axis substantially vertical, as shown in FIG. 13, so that any lateral movement in a direction toward its connector member 18 would be impeded by the adjacent links 114 (see FIGS. 2 and 14) because its major axis presents a larger dimension than the spacing between the adjacent links 114; any such lateral movement would also affect the opposite bight element 112 which would be similarly impeded in its lateral movemment by the adjacent links 14. Such lateral movement of the bight element 12 is further precluded because its vertical edge portions would abut the adjacent vertical edge portions of the adjacent pair of bight elements 112 of the coil 110; similarly, the vertical edge portions of bight element 112 would engage those of the adjacent pair of bight elements 12.

The strength of the slide fastener is substantially increased by the above arrangement which also substantially increases the flexibility of the slide fastener. For example, the parallel construction of the front links 14 and 114 as seen in FIG. 14 is symmetrical to the herringbone construction of the rear links 16 and 116 as seen in FIG. 16. Such an asymmetrical arrangement permits easy flexing of the slide fastener perpendicular to its longitudinal axis whereby it may be installed in a garment opening (not shown) without bunching of the garment material and whereby it may bend with the garment when being worn without agitation and/or irritation to the wearer. The flexibility of the slide fastener becomes apparent by comparing the four sides thereof as shown in FIGS. 14 – 17 which illustrate a close interlocking arrangement of the coils 10 and 110 without sharp edges and/or abutments. Such an arrangement is accomplished by the constantly changing geometry of each coil 10 (110), i.e., the major axis of the filament of coil 10 (110) varies through each complete convolution thereof, as shown in FIGS. 4, 7, 10 and 13. This changing of the geometry of each coiled convolution permits the utilization of more convolutions per unit length of the coil resulting in the particular advantages of increasing the longitudinal and lateral strength of the slide fastener device without increasing the bulk or diametrical size of the filament or the coil. For example, the front or first link 14 of coil 10 nests with the front or first links 114 of coil 110 and, similarly, the rear or second link 16 nests with the rear or second link 116; as is apparent in FIGS. 14 and 16, such nesting arrangements present a close fitting, generally parallel construction for the first links 14 and 114, and a generally herringbone construction for the second links 16 and 116.

The method of making the interengaging coils for the slide fastener device commences with a pair of continuous filaments having generally elliptical cross sections and being supplied under suitable tension from supply spools or the like to a shaping mandrel. The filaments are oriented so that their major axes are substantially parallel to the longitudinal axis of the mandrel and then are simultaneously wound in opposite directions about the mandrel with one filament being 180° out of phase with the second filament so that they will cross each other.

The coils 10 and 110 are formed with a plurality of convolutions, each of which includes the four components, namely, the bight element 12, the first link 14, the second link 16 and the connector member 18. As each convolution is being shaped, its filaments geometry is continuously changing by reorienting the major axis of its cross section resulting in an asymmetrical relationship between the first and second links. The reorientation of each bight element 12 (112) is accomplished by aligning its major axis so as to be generally parallel to a longitudinal axis defined by the intermeshed coils; the reorientation of each connector member 18 (118) is accomplished by aligning its major axis so as to be generally parallel to such longitudinal axis. The reorientation of each of the first and second links is accomplished by inclining their major axes relative to such longitudinal axis and at a different angle between each other. Each of the bight elements 12 (112) is shaped by aligning the major axis thereof so as to be generally parallel to each other and to the longitudinal axis of the intermeshed coils; each connector member 18 (118) is formed by being wrapped around adjacent portions of the bight elements with the connector members of one coil being wrapped around the bight elements of the other coil.

The oppositely wound filaments are maintained under tension to assure cooperation with the shaping mandrel, after which the interfitting components of the convolutions are maintained in intermeshed relationship by means of an internal support projecting from the shaping mandrel. The intermeshed coils then pass through a heating stage to permanently form the shaped components and are then removed from such internal support.

Figure 18:
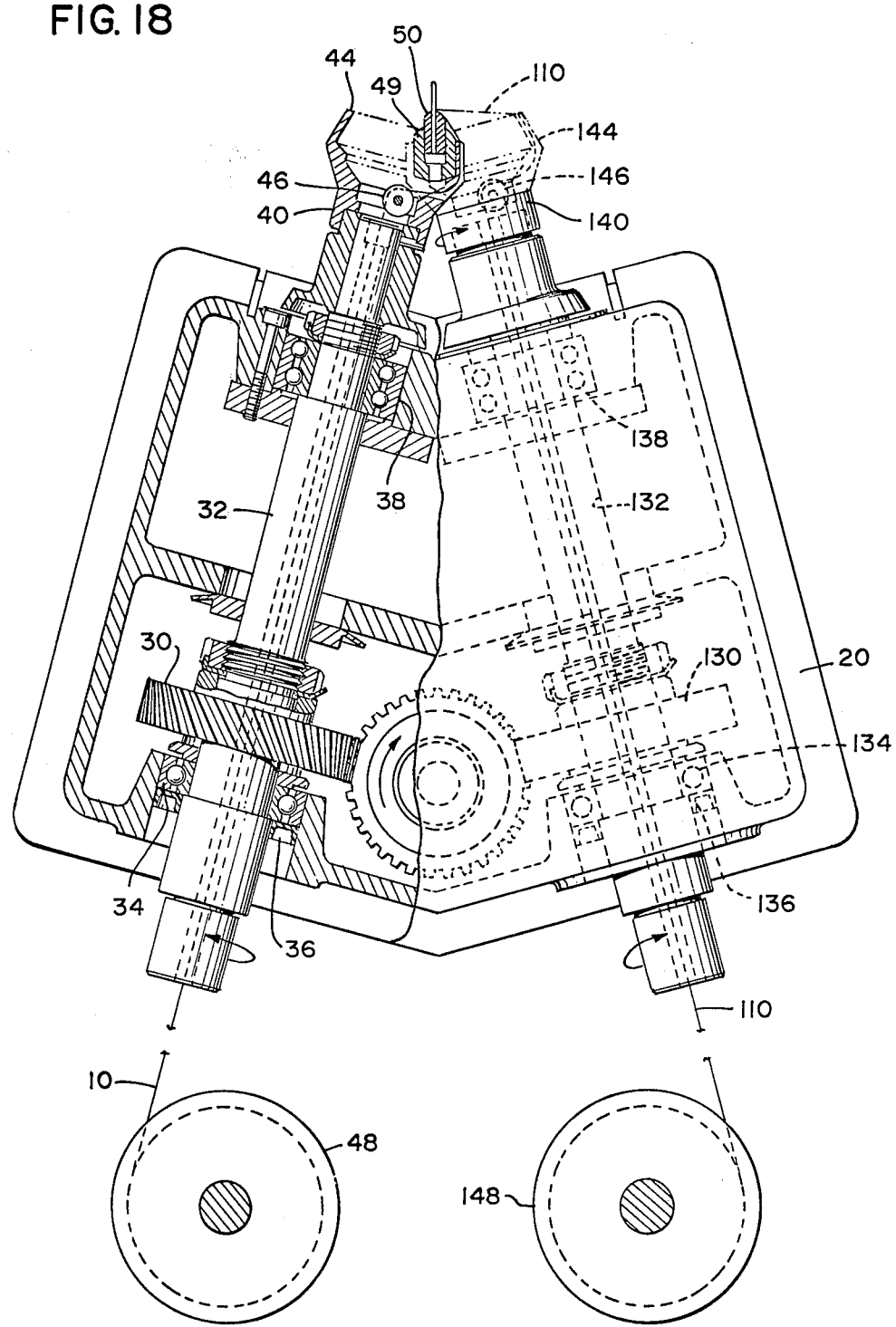
FIG. 18 is a partial elevation view with parts in section of a coiling apparatus embodying the present invention.

Apparatus for making the filamentary coils in accordance with the present invention is illustrated in FIG. 18 as including a casing 20 which houses power driven-drive and gearing assemblies. A drive shaft 22 is rotated by any suitable power means such as an electric motor (not shown) and a helical gear 24 is fixed to shaft 22 for rotation therewith.

Figure 20:
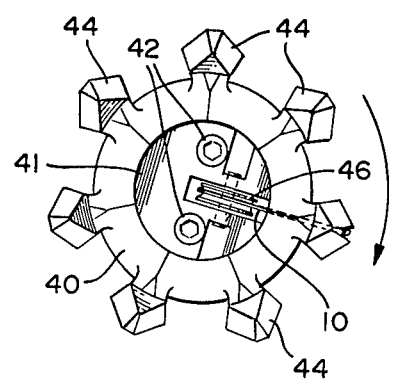
FIG. 20 is a top plan view of FIG. 19.
Figure 19:
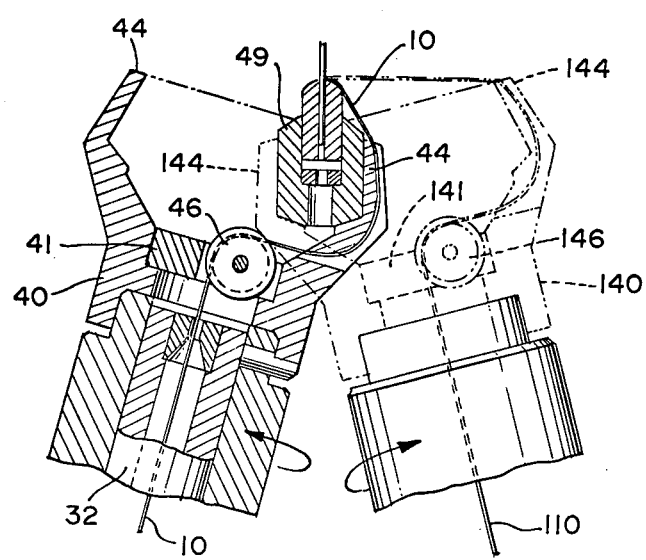
FIG. 19 is an enlarged elevation view of the top portion of FIG. 18.
Figure 24:
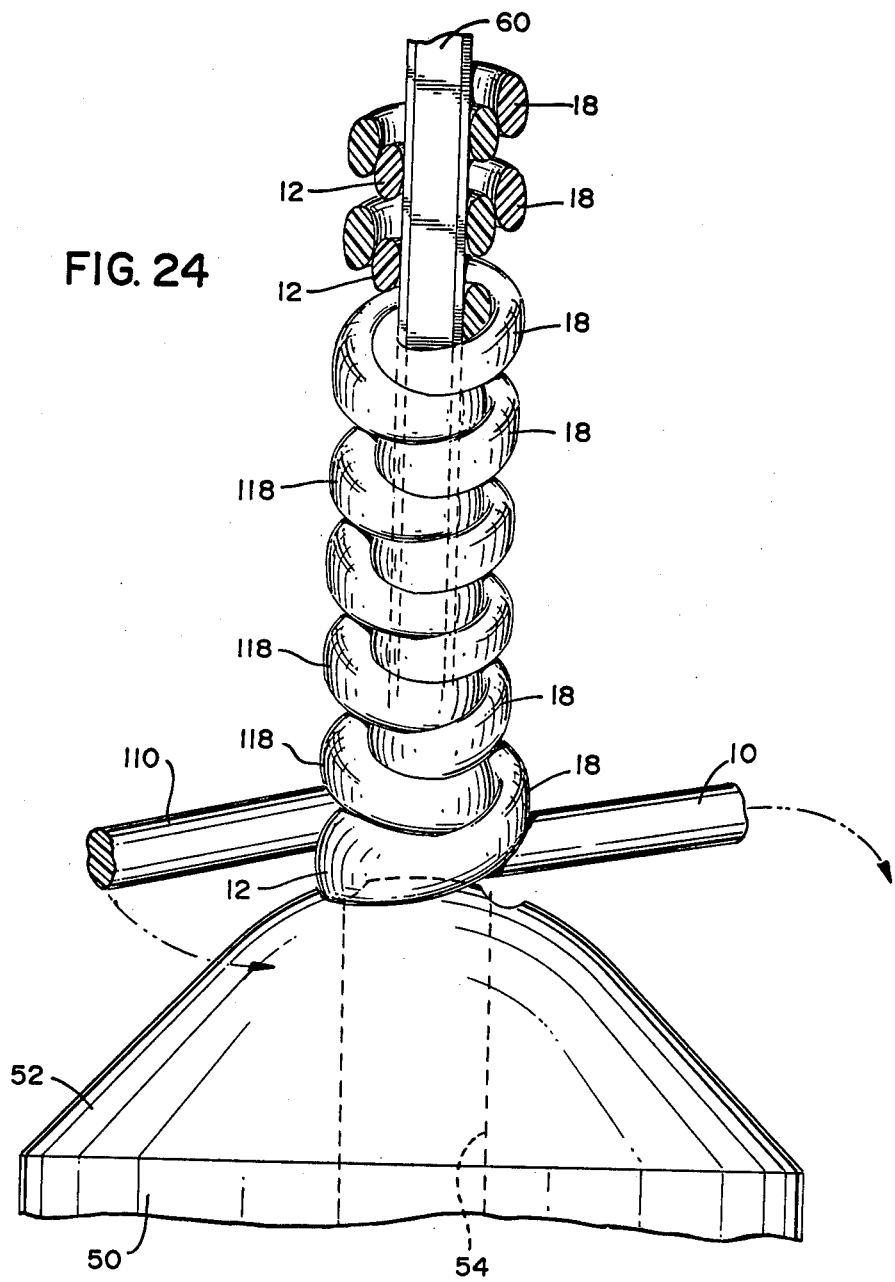
FIG. 24 is a partial front elevation of FIG. 21 with parts added.

The two coilers shown in FIGS. 18 and 19 are substantially similar so that only one is being described and identified with reference numbers; similar reference numerals with 100 added for correlated components of the second coiler are being shown in parentheses. For example, the two coilers are inclined toward each other and the driving gear 24 meshes with a helical gear 30 (130) which is fixed to a longitudinally bored shaft 32 (132) that is rotatably mounted and sealed in the casing 20 by a suitable bar 34 (134) and a shaft seal 36 (136) at its lower end and by a ball bearing assembly 38 (138) at its upper end. A shank member 40 (140) is fixed to the upper end of the shaft 32 (132) by any suitable means such as a clamping block 41 (141) and cap screws 42 (142); see FIG. 20. A plurality of spaced odontoid or lugs 44 (144) are circumferentially spaced about the upper periphery of the shank member. A guide pulley or wheel 46 (146) is rotatably carried in the shank member 40 (140) and the strand of filamentary material of the coil 10 (110) progresses from a supply spool 48 (148) through the central bore of the shaft 32 (132) and around the pulley 46 (146) through a slotted portion of one of the projections 44 (144) from which it is wrapped on a mandrel, as described below.

The odontoid projections 44 and 144 are shaped so as to support an oval-shaped mandrel holder 49 in a substantially floating condition. Thus, rotation of the shank members 40 and 140 in opposite directions causes the projections 44 to pass between the projections 144 so that the rotatable path of the projections 44 intersects the rotatable path of the projections 144.

It is to be recognized that the specific details of construction of the two coilers described above may take a variety of conventional forms; consequently, further description of the coiler components as well as their path sequence of operation is being omitted for the sake of brevity. For a complete description of coilers that may be utilized herewith, attention is directed to U.S. Pat. No. 3,053,288 which shows various types of coilers and which is incorporated herein by reference.

The floating mandrel holder 49 has a centrally disposed bore which supports a mandrel base 50, the lower portion of which is substantially circular to conform to the shape of the mandrel holder bore. The upper portion of the mandrel base 50 includes a generally frusto-conical surface 52, the apex of which is truncated. A rectangular bore 54 extends centrally through the mandrel base 50 and intersects the truncated surface. As viewed in FIG. 21, an elongated slot 56 is disposed adjacent the left short side of the rectangular bore 54 and a similar slot 58 is disposed adjacent the right short side thereof. A generally rectangular mandrel 60 fits into the rectangular opening 54. Adjacent the notches 56 and 58 the sides of mandrel 60 are slanted with a decreasing taper defining similarly sloped surfaces 62 and 64, respectively. Also adjacent the rectangular opening 54 the mandrel 60 has a rear sloping surface 66 which terminates in the general area of the surfaces 62 and 64. As is illustrated in FIG. 23, the side of the mandrel opposite to the sloping surface 66 is provided with a front sloping surface 68, the angle of inclination of which is substantially greater than the angle of inclination of the sloping surface 66.

The mandrel 60 is provided with a longitudinally disposed, rectangular slot which receives a rectangularly shaped extension 70 in telescoping fashion. As is illustrated in FIG. 21, a heat box 72 surrounds the extension 70 to provide a permanent set for the shaped coils. Heat is provided to the heat box 72 by any suitable means, e.g. electric resistance coils or the like.

Figure 25:
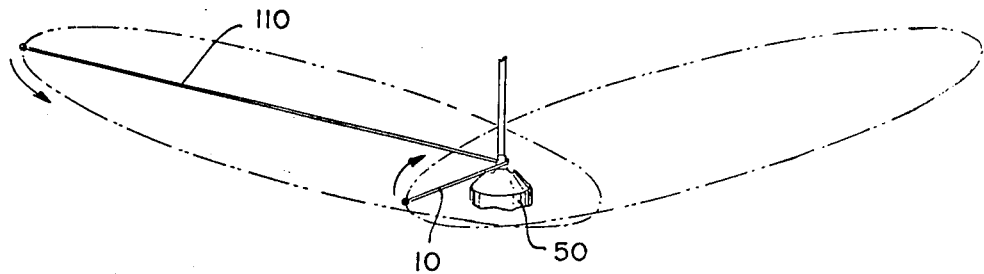
FIG. 25 is a schematic diagram illustrating the relative initial positions of the two coils being wound on the mandrel at the beginning of a winding operation.
Figure 26:
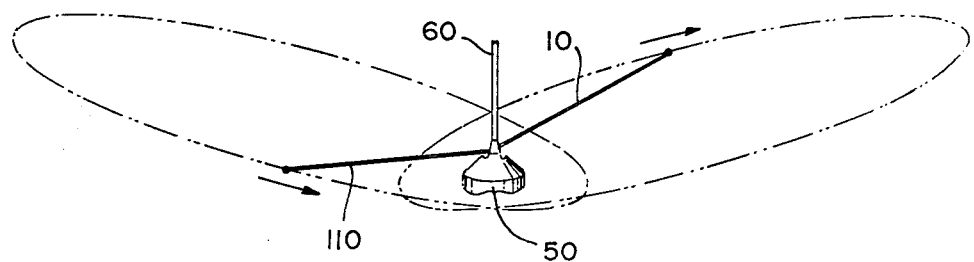
FIG. 26 is a view similar to FIG. 25 wherein the two coils are displaced 90° from the initial position of FIG. 25.
Figure 27:
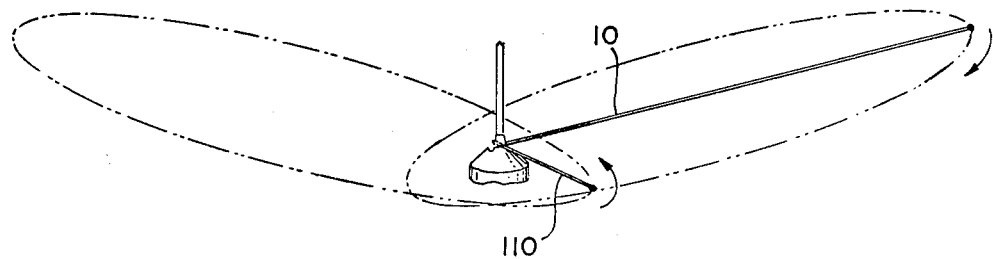
FIG. 27 is a view similar to FIG. 25 wherein the two coils are displaced 180° from the initial position of FIG. 25.
Figure 28:
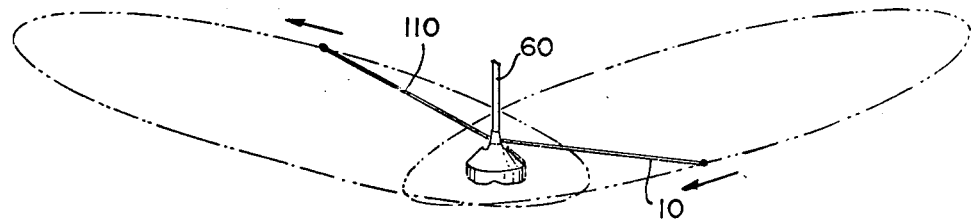
FIG. 28 is a view similar to FIG. 25 wherein the two coils are displaced 270 ° from the initial position of FIG. 25.

As illustrated in FIG. 25, the two filaments of the coils 10 and 110 are wound about the mandrel 60 in opposite directions with the two filaments being out of phase by 180°. The coiler heads rotate in opposite directions so that the filament of the coil 10 advances through a 90° sector in a clockwise direction from the position in FIG. 25 to the position of FIG. 26; simultaneously, the filament of the coil 110 advances through a 90° sector in a counter-clockwise direction. FIG. 27 shows the filaments of the coils 10 and 110 being advanced through another 90° sector while FIG. 28 shows such filaments being advanced through another 90° sector. From FIG. 28, the filaments of the coils 10 and 110 will proceed to their initial position, as illustrated in FIG. 25.

During the formation of the intermeshed coils, the bight elements 12 and 112 are formed by contacting the mandrel surfaces while the connector members 18 and 118 are formed by contacting those portions of the opposite filaments which are wrapped on the mandrel. The intermeshed coils are thus formed by the mandrel and filament interaction and are moved vertically along the longitudinal axis of the mandrel, as shown in FIGS. 21–24. During their vertical movement, the intermeshed coils 12 and 112 are guided by the mandrel extension 70 and are passed through the heating box 72 so that the formed intermeshed coils are permanently set or cured by heating. After leaving the heating box, the intermeshed coils undergo an air cooling stage by being moved in such a manner as to prevent stretching or compression, i.e., by two constant speed driven pulleys or wheels (not shown). After leaving such wheels, the intermeshed coils drop through a distance of about 5 feet whereby they are finally air cooled and, by hanging downwardly, gravity prevents the coils from being kinked, convoluted or otherwise disturbed.

Inasmuch as the present invention is subject to many modifications, variations and changes in detail, it is intended that all matter contained in the foregoing description or shown in the accompanying drawings shall be interpreted as illustrative and not in a limiting sense.

What is claimed is:

1. Apparatus for forming a pair of coils for a slide fastener device comprising
   a pair of rotatable coiling heads for oppositely rotating a pair of filaments having generally elliptical cross sections,
   a mandrel operatively associated with said coiling heads about which the filaments are wound,
   a plurality of inclined, filament engaging surfaces rectangularly disposed on said mandrel for shaping the filaments into intermeshed coils, and
   one of said surfaces being asymmetrical relative to the other surfaces whereby the intermeshed coils are formed with an asymmetrical pattern.

2. Apparatus as claimed in claim 1 wherein said filament engaging surfaces include three similarly inclined surfaces which are inclined differently from the one asymmetrical surface.

3. Apparatus for forming a pair of coils for a slide fastener device comprising
   a coiler machine including a pair of coiling heads for rotating a pair of filaments in opposite directions, which filaments have generally elliptical cross sections,
a mandrel holder disposed between said coiling heads,
a mandrel carried by said holder and having a plurality of sloping surfaces thereon,
alignment means on said holder receiving said filaments and aligning the major axes thereof so as to be generally parallel to a longitudinal axis defined by the intermeshed coils, and
an asymmetrical surface on said mandrel disposed adjacent the alignment means on said holder and being sequentially engaged by said filaments to realign the major axes thereof so as to form asymmetrical portions on said intermeshed coils.

4. Apparatus as claimed in claim 3 wherein said alignment means comprises a pair of notches, one for each filament.

5. Apparatus as claimed in claim 4 wherein said asymmetrical surface comprises an inclined surface extending between said pair of notches.

6. Apparatus as claimed in claim 5 wherein said mandrel has an elongated rectangular configuration for guiding the movement of the intermeshed coils after formation thereof.

7. Apparatus as claimed in claim 6 wherein said mandrel includes a plurality of surfaces having lesser angles of inclination than said asymmetrical surface relative to a longitudinal axis defined by the elongated rectangular configuration.

8. Apparatus as claimed in claim 7 wherein said mandrel includes an extension to facilitate continued guided movement of the intermeshed coils after their formation and wherein heating means surrounds said extension for permanently setting the intermeshed coils after their formation.

* * * * *